United States Patent [19]

Parent

[11] 4,051,350

[45] Sept. 27, 1977

[54] POSITION MEASURING DEVICE

[75] Inventor: Guy Parent, Le Plessis-Robinson, France

[73] Assignee: Societe Anonyme dite: Compagnie Industrielle des Telecommunications Cit-Alcatel, Paris, France

[21] Appl. No.: 659,061

[22] Filed: Feb. 18, 1976

[30] Foreign Application Priority Data

Feb. 27, 1975 France ............................ 75.06084

[51] Int. Cl.$^2$ .................. G06G 7/22; G06G 7/70; G06G 7/78
[52] U.S. Cl. .................. 364/432; 340/3 R; 340/6 R; 340/16 R; 364/460; 364/815; 364/817
[58] Field of Search .................. 235/150.27; 340/3 R, 340/6 R, 16 R; 343/10, 112 C

[56] References Cited

U.S. PATENT DOCUMENTS 3,559,161  1/1971  Raudsep ........................ 340/6 R Primary Examiner—R. Stephen Dildine, Jr.
Attorney, Agent, or Firm—Sughrue, Rothwell, Mion, Zinn and Macpeak

[57] ABSTRACT

The invention concerns a position measuring device used for measuring the position of a vessel equipped with three hydrophones arranged at the apexes of a triangle in relation to a transmitting beacon on the sea bed. Measuring of the differences in the travel time between the beacon and the various hydrophones as well as of the depth of the water and analogic calculating of the position of the vessel in a simple way and without approximation. Application to offshore drilling vessels.

11 Claims, 7 Drawing Figures

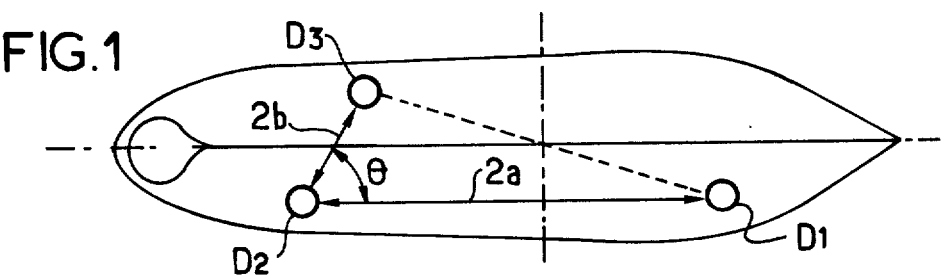
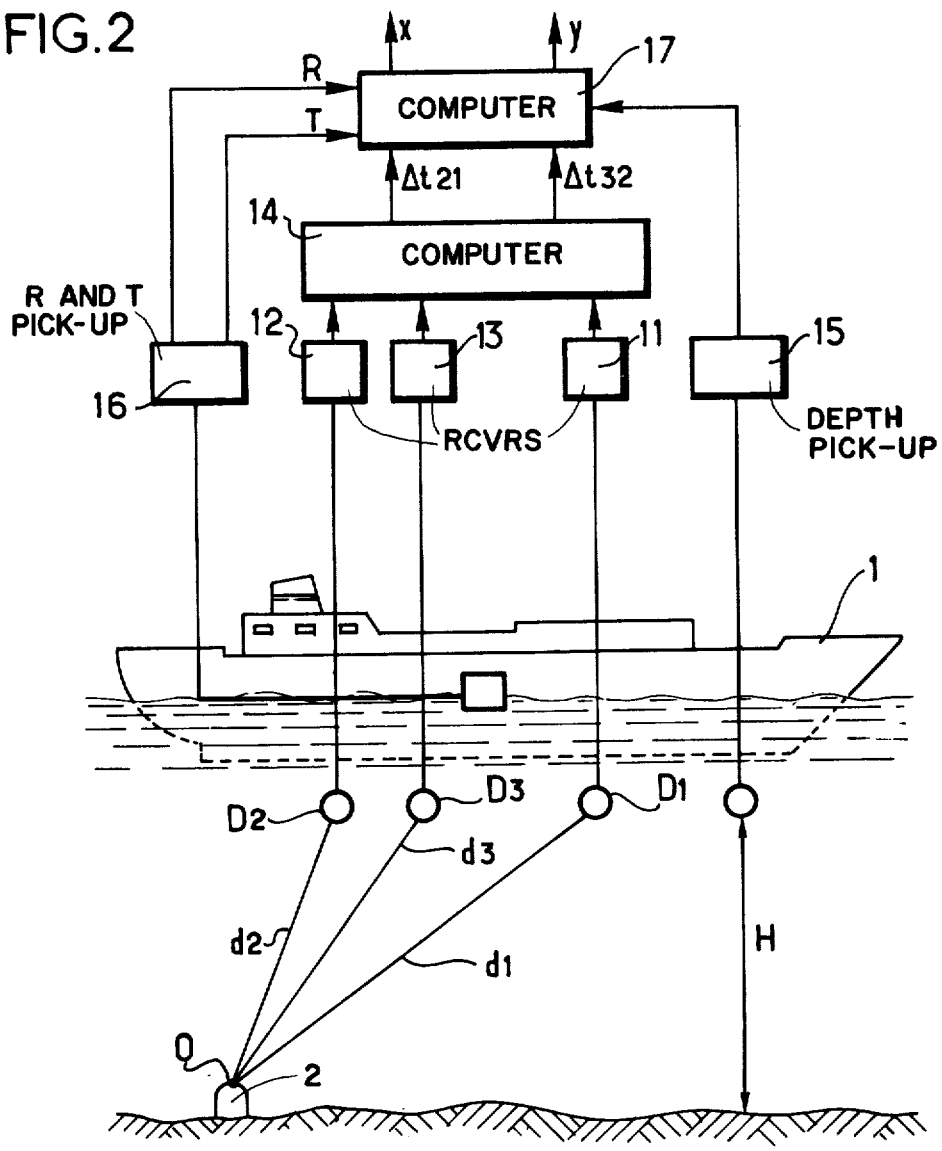

POSITION MEASURING DEVICE

The present invention relates to a position measuring device enabling the calculating of magnitudes proportional to the distances X and Y of a vessel which can move on the water in relation to the axes of orthogonal co-ordinates IX and IY comprising a transmitter of sound waves placed at a fixed point O situated on the sea bed, at least three detectors D1, D2, D3 on the vessel and arranged at the apexes of a triangle, IX being parallel to $D_2 D_1$ and the plane of the axes being the plane of the said triangle, means enabling the calculating of the depth of water H below the vessel, means enabling the calculating of the difference in time of the travel $\Delta t_{21}$ of the sound waves between the point 0 and D2 on the one hand and between the point 0 and D1 on the other hand and means enabling the calculating of the difference in the travel time $\Delta t_{32}$ of the sound waves between the point 0 and D3 on the one hand and between the point 0 and D2 on the other hand.

In known devices, the calculating of distances $x$ and $y$ of 0 in relation to the mid planes of $D_2 D_1$ and of $D_2 D_3$ is effected by a digital computer using approximate formulas. Moreover, that known computer is fed with other magnitudes of measurements, more particularly angles of phase difference between the sound waves reaching the various detectors.

Such devices for the position measuring device are used on vessels or drilling platforms, for example and are used for determining the position of the vessel in relation to a submerged beacon on the sea bed. The beacon emits sound waves which are detected by three detectors installed on the bottom of the vessel.

The position measuring device according to the invention is very simple and makes it possible to effect calculations of the magnitudes proportional to the errors X and Y by simple analog circuits using only the measured magnitudes $\Delta t_{21}$, $\Delta t_{32}$ and H and without effecting any approximations.

The position measuring device according to the invention is characterized in that it comprises first means supplying, from the difference in travel time $\Delta t_{21}$, by multiplication by a coefficient depending on the propagation speed c of sound waves in water, a signal xo equal to the difference between $d_2$ (OD$_2$) and $d_1$ (OD$_1$) and, from the difference in travel time $\Delta t_{32}$ by multiplication by a coefficient depending on c, a signal yo equal to the difference between $d_3$ (OD$_3$) and $d_2$ (OD$_2$);

Second means supplying, by algebraic multiplications and additions, based on the signals xo, $d_1$, a signal equal to kx, $x$ being the distance of the point 0 in relation to the mid plane of D1 D2;

Third means supplying, by algebraic multiplications and additions, based on signals xo, yo, $d_1$, a signal ky, $y$ being equal to the distance of 0 in relation to the mid plane of D2 D3;

Fourth means supplying, based on kx, the signal kX;

Fifth means supplying, based on the signal kx, ky, the signal kY;

Sixth means supplying, by algebraic multiplications and additions, based on signals kx, ky and H, a signal equal to $k^2 d_1^2$ which, after application to a square root extractor, is applied to the second and third means.

Thus, a servo-control system has been formed, controlling, by means of the signal $kd_1$, the second and third means supplying kx and ky.

According to a first embodiment of the invention, in which k is assumed to be equal to 1, the position measuring device is characterized in that the said second means comprise an amplifier receiving, at the input, the signal xo and supplying, at its output, a signal $- xo/4a$, (where $a = D_2 D_1 /2$), an algebraic summing device fed by the signals xo and $d_1$ and supplying a signal $2d_1 + xo$;

a multiplier having 2 inputs, one of whose inputs is connected to the output of the said amplifier and whose other input is connected to the output of the said summing device and supplying the signal $x$;

in that the said third means comprise an amplifier receiving, on its input, the signal yo and supplying, on its output, the signal $- yo/4b$, ($b = D_2 D_3/2$), an algebraic summing device receiving the signals xo, yo and $d_1$ supplying, on its output, the signal $2d_1 + 2xo + yo$;

A multiplier having two inputs, one of whose inputs is connected to the output of said amplifier and whose other input is connected to the output of the said summing device and supplying, on its output, the signal $y$;

in that the said fourth means comprise a summing device receiving, on one input, the signal $x$ and on another input, a constant signal and supplying, on it output, the signal $X = x + m$, $m$ being the abscissa of the mid-point of $D_2 D_1$ in relation to the axes IX, IY; in that the said first means comprise a summing device receiving, on one input, the signal $x$, on a second input, the signal $y$ and on a third input, a constant signal and supplying, on its output, a signal $- x/tg\theta + y/\sin\theta - a/tg\theta + b/\sin\theta + n$; $\theta$ being the angle formed by $D_3 D_2$ with $D_2 D_1$; $n$ being the ordinate of M, the mid-point of $D_2 D_1$ in relation to the axes, IX, IY and in that the said sixth means comprise:

a first summing device fed with the signal $x$ coming from the said second means and with a constant signal and supplying a signal $x + a$;

a second summing device fed with the signal $x$ coming from the said second means, with the signal $y$ coming from the said third means and with a constant signal and supplying a signal $Y - n$;

a first multiplier having two inputs whose two inputs are connected to the output of the said first summing device;

a second multiplier having two inputs, whose two inputs are connected to the output of the second summing device;

a third summing device, one of whose inputs is connected to the output of the first multiplier and a second input of which is connected to the output of the second multiplier and a third input of which receives the signal $H^2$ and whose output supplies the signal $d_1^2$ which is applied to a square root extractor whose output is connected to the algebraic summing devices of the said second and third means.

According to a first improvement of that embodiment, making it possible to effect very simply a correction of pitching and rolling, the summing device of the fourth means comprises an input to which is applied a signal equal to T.H., T being the angle of pitch and the summing device of the fifth means, comprises an input to which is applied a signal equal to RH, R being the roll angle.

According to a second improvement of that embodiment, making it possible to effect another correcting of pitch and roll, the said third summing device of the said sixth means receives, on a fourth input, a signal equal to TH and, on a fifth input, a signal equal to RH.

According to a third improvement of that embodiment making it possible to effect a third correction of pitch and roll, the said first means supply $xo$ by multiplication of $\Delta t_{21}$ by a coefficient which is substantially equal to $c(1 + T^2/2)$ and $yo$, by multiplication of $\Delta t_{32}$ by a coefficient substantially equal to $c(1 + R^2/2)$.

According to a seond embodiment of the invention, $k$ is assumed to be equal to $1/H$ and the said second means comprise:

an input amplifier receiving, at the input, the signal $xo$ and supplying, at its output, the signal $-xo/4a$;

a first multiplier having two inputs, receiving, on one input, the signal $xo$ and, on the other input, the signal $1/H$;

an algebraic summing device having two inputs, receiving, on one input, the signal $xo/H$ coming from the first multiplier and, on the other, the signal $d_1/H$ and supplying, at its output, a signal $(2d_1 + xo/H)$;

a second multiplier having two inputs, receiving, on one input, the signal $-xo14a$ coming from the input amplifier and, on the other input, the signal coming from the said algebraic summing device and supplying, at its output, the signal $x1H$; in that the said third means comprise an input amplifier receiving, at its input, the signal $yo$ and supplying the signal $-yo/4b$;

a first multiplier having 2 inputs, receiving, on one input, the signal yo and, on the other input, the signal $1/H$ and supplying a signal $yo/H$;

an algebraic summing device having 3 inputs, receiving, on one input, the signal $yo/H$ coming from the first multiplier, on another input, the signal $xo/H$ coming from the first multiplier of the said first means and, on the third input, a signal $d_1/H$ and supplying, on its output, the signal $(2d_1 + 2xo + yo/H)$;

a second multiplier having two inputs, one of whose inputs is connected to the output of the input amplifier and whose other input is connected to the output of the said algebraic summing device and supplying, at its output, the signal $y/H$; in that the said fourth means comprise a summing device, receiving, on one input, the signal $x/H$ and, on an other input, a signal $1/H$ and supplying, at its output, the signal $X/H = x + m/H$, $m$ being the abscissa of M, the mid-point of $D_2D_1$ in relation to the axes IX, IY;

in that the said fifth means comprise a summing device receiving, on one input, the signal $x/H$, on a second input, the signal $X/H$ and on a third input, the signal $1/H$ and supplying, on its output, a signal $$-\frac{1}{tg\theta}\ \frac{x}{H} + \frac{1}{\sin\theta}\ \frac{y}{H} + \frac{1}{H}(\frac{b}{\sin\theta} - \frac{a}{tg\theta} + n);$$

$\theta$ being the angle formed by $D_3D_2$ with $D_2D_1$; $n$ being the ordinate of M, the mid-point of $D_2D_1$ in relation to the coordinate axes IX, IY; in that the said sixth means comprise:

a first summing device having two inputs, receiving, on one input, the signal $x/H$ coming from the said second means and, on the other input, the signal $1/H$ and supplying, at its output, a signal $x + a/H$;

a second summing device having two inputs, receiving, on one input, the signal $x/H$ coming from the said second means on another input, the signal $y/H$ coming from the said third means, and, on a third input, the signal $1/H$ and supplying, at its output, a signal $(Y - n)/H$;

a first multiplier having two inputs, whose inputs are connected to the output of the first summing device;

a second multiplier having two inputs, whose inputs are connected to the output of the second summing device;

a third summing device, one of whose inputs is connected to the output of the first multiplier, a second of whose inputs is connected to the output of the second multiplier and a third input of which is fed by the unity signal;

The said third summing device supplying, at its output, a signal $(d_1/H)^2$ equal to the sum of the signals 1, $(x + a/H)^2$ and $(Y-n/H)^2$ which is applied to the input of a square root extractor whose output is connected to an input of the summing device of the said second third means.

In the embodiment where $k$ is equal to $1/H$, the magnitude of feed-back signal $d_1/H$ is close to unity, so much so that the multiplying and square root extracting elements operate with a low dynamic ratio and therefore allow great accuracy to be obtained.

According to a first improvement to that second embodiment enabling a correction of roll and of pitch to be effected very simply, the summing device of the said fourth means comprises an input to which is applied a signal equal to T, T being the angle of pitch and the summing device of the fifth means comprises an input to which is applied a signal equal to R, R being the angle of roll.

According to a second improvement of that second embodiment enabling the effecting of another correction of pitch and of roll, the position measuring device is characterized in that the said third summing device of the said sixth means receives, on a fourth input, the signal $T/H$ and, on a fifth input, the signal $R/H$.

According to a third improvement of that second embodiment enabling a third correction of pitch and of roll to be effected, the said first means supply $xo$ by multiplication of $\Delta t_{21}$ by a coefficient substantially equal to $c(1 + T^2/2)$ and $yo$ by multiplication of $\Delta t_{32}$ by a coefficient substantially equal to $c(1 + R^2/2)$.

The present invention will be better understood with reference to the following description and to the accompanying drawings, in which:

FIG. 1 shows the arrangement, on board a vessel, of the three hydrophones of the position measuring device according to the invention;

FIG. 2 is the block diagram of the position measuring device according to the invention;

Figure 3:
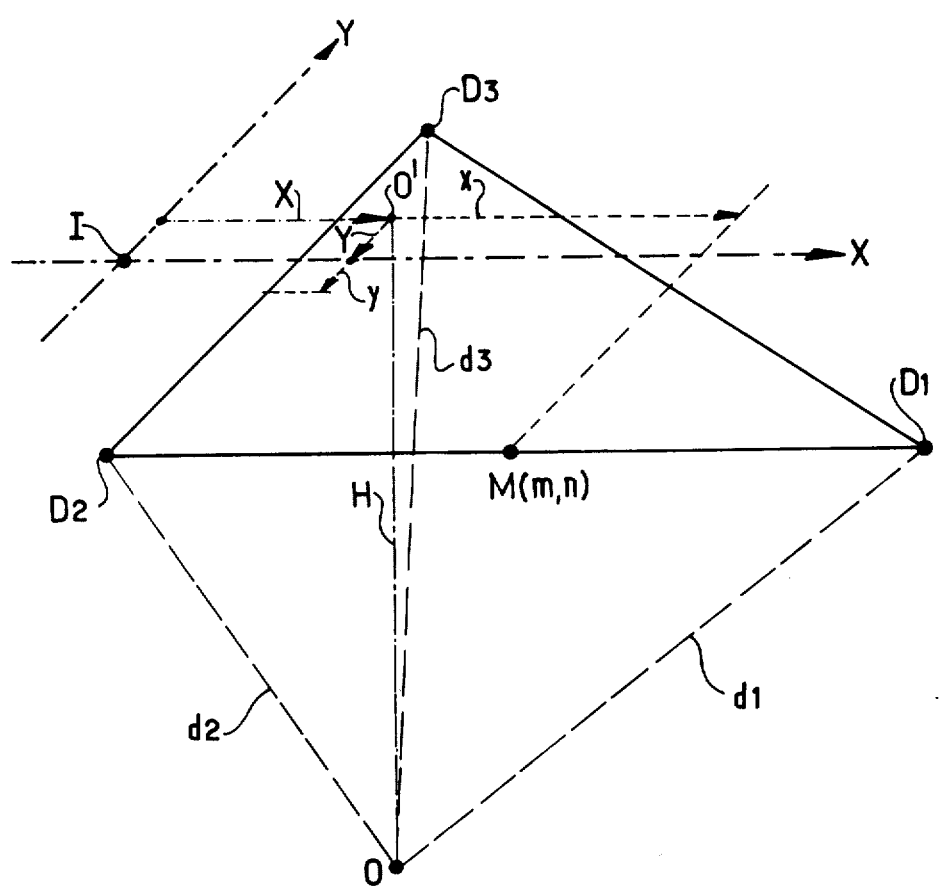
FIG. 3 shows, on a geometrical diagram, the various magnitudes used in the position measuring device according to the invention.

The position measuring device is particularly intended to be installed on a vessel (or on a platform) for the exploring or working of sea beds and, more particularly, for offshore drilling for petroleum. It can provide, with great accuracy, the position of that vessel in relation to a beacon laid on the sea bed, this enabling, for example, the determining of the position of a sounding device in relation to the wellhead to position the boring bit correctly.

FIG. 1 shows, diagrammatically a vessel at the bottom of which are placed three detectors which are hydrophones D1, D2, D3 arranged at the apexes of a triangle in a horizontal plane. The hydrophones D1 and D2 are distant by $2a$ and are arranged parallel to the longitudinal axis of the vessel.

The hydrophones D2 and D3 are distant by $2b$ and D3 D2 forms an angle of $\theta$ with D2 D1.

FIG. 2 shows the block diagram of the position measuring device according to the invention.

It comprises the three hydrophones D1, D2 and D3 with which the vessel 1 is equipped and which receive sound waves coming from a beacon 2 placed on the sea bed at the point 0, where $OD1 = d_1$, $OD2 = d_2$, $OD3 = d_3$. Each hydrophone is followed by a receiver 11, 12 or 13 ensuring the processing of the signals coming from the corresponding hydrophone.

The receivers 11, 12 and 13 are followed by a circuit 14 sending out a continuous signal indicating the difference $\Delta t_{21}$ between the travel times of the sound waves between the point 0 and the hydrophone D2 on the one hand and between the point 0 and the hydrophone D1 on the other hand, as well as a continuous signal indicating the difference $\Delta t_{32}$ between the travel times of the sound waves between the point O and the hydrophone D3 on the one hand and between the point O and the hydrophone D2 on the other hand.

The vessel 1 is also equipped with a device 15 indicating permanently the depth of the water H below the hydrophones, as well as with a device 16 measuring the angle of roll R and the angle of pitch T of the vessel 1.

The continuous signals representative of $\Delta t_{21}$ and of $\Delta t_{32}$, as well as H and, contingently R and T, are applied to a computer 17 shown in detail in FIGS. 4 to 7 and which supplies signals equal to or proportional to X and Y, X being the abscissa and the ordinate of the projection O' from the point O to the plane of the triangle D1, D2, D3 in relation to 2 orthogonal axes of coordinates IX and IY, IX being parallel to D2 D1.

FIG. 3 shows the axes of coordinates IX and IY which are in the plane of the triangle D1, D2, D3. The mid-point M of D1 D2 has as its coordinates $m$ and $n$ in relation to the axes IX and IY. $x$ and $y$ will be the distances of O' in relation to the mid-perpendicular of D2 D1 and of D3 D2.

It is possible to calculate $d_1$, $d_2$, $d_3$ in relation to $x$, Y and $n$:

$$d_1^2 = H^2 + (x + a)^2 + (Y - n)^2$$

$$d_2^2 - d_1^2 = (d2 - d1)(d2 + d1) = -4a\,x$$

$$d_3^2 - d_2^2 = (d3 - d2)(d3 + d2) = -4b\,y$$

Assuming that $xo = d_2 - d_1$ and $yo = d_3 - d_2$ and observing that $Y - n = (y + b)\sin\theta$ and that $Y + n = (y - b)\sin\theta$, the following formulas are deduced:

$$x = -xo/4a\,(2d_1 + xo) \quad (1)$$

$$y = -yo/4b\,(2d_1 + 2xo + yo) \quad (2)$$

$$d_1^2 = H^2 + (x + a)^2 + (Y - n)^2 \quad (3)$$

$$Y = (-x/tg\theta) + (y/\sin\theta) + (b/\sin\theta) - (a/tg\theta) + n \quad (4)$$

$$X = x + m \quad (5)$$

Figure 4:
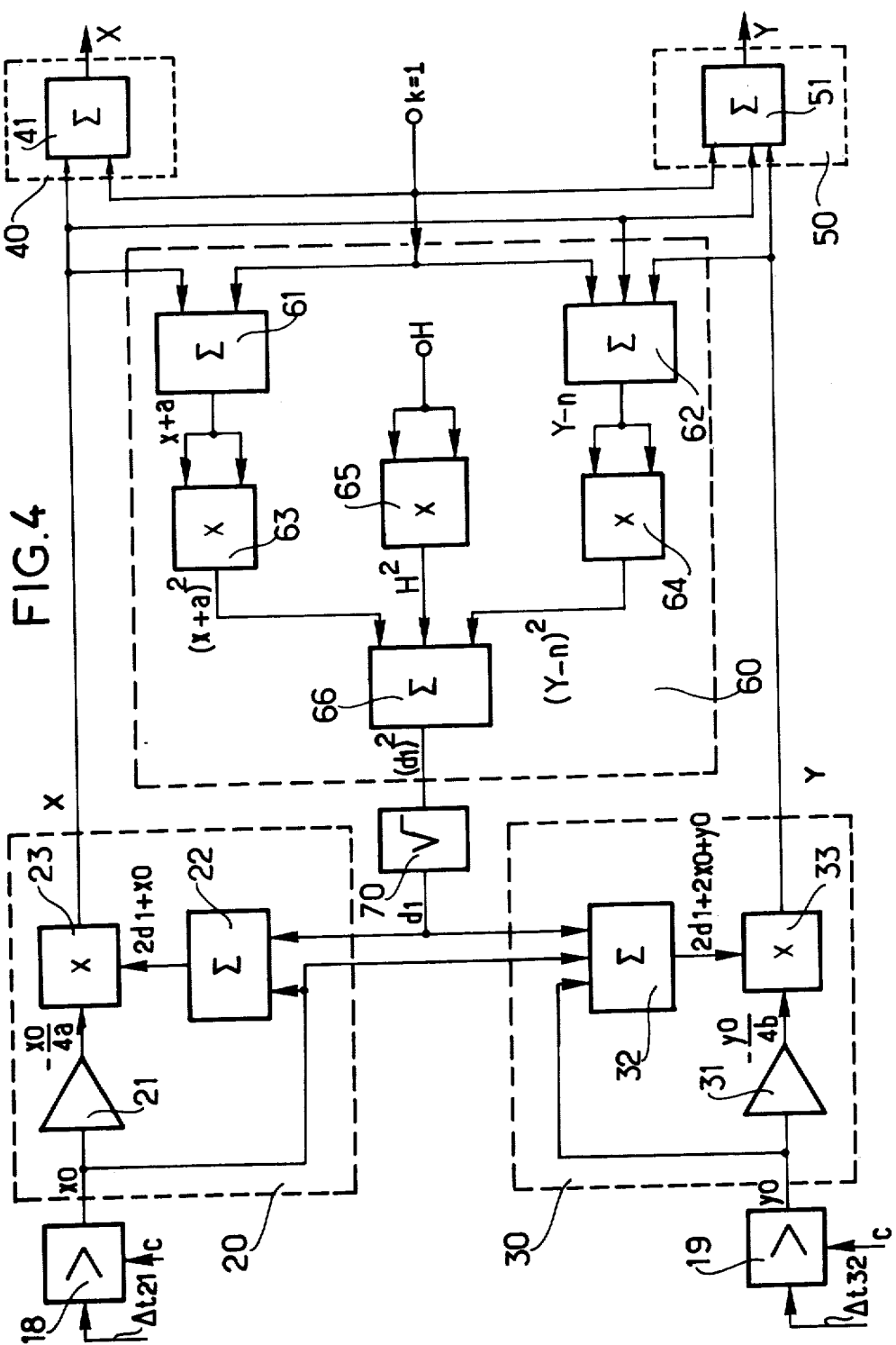
FIG. 4 shows a first embodiment of the computer of the position measuring device according to the invention.

FIG. 4 shows a first embodiment of the computer 17 according to the invention.

The magnitudes $xo$ and $yo$ corresponding to the differences in travel between $d_2 - d_1$ and $d_3 - d_2$ are obtained by multiplying by $c$, which is the speed of sound in water, the differences in travel time $\Delta t_{21}$ and $\Delta t_{32}$. That multiplication is effected by a first amplifying device 18 and a second amplifying device 19 supplied, the one with $\Delta t_{21}$, and the other with $\Delta t_{32}$; the amplifying device 18 supplies the signal $xo = c \cdot \Delta t_{21}$ and the amplifying device 19 supplies the signal $yo = c \cdot \Delta t_{32}$.

The computer 17 comprises means 20 which, based on the signals $xo$ and $d_1$, supply $x$.

The means 20 comprise an amplifier 21 supplied with the signal $xo$ coming from the amplifying device 18 and supplying a signal $-xo/4a$, a summing device 22 one of whose inputs receives the signal $xo$ coming from the amplifying device 18 and whose other input receives a signal $d_1$ coming from a square root extractor 70 fed by means 60 supplying the signal $d_1^2$ whose constitution will be described subsequently.

The summing device 22 supplies, at its output, a signal equal to $2d_1 + xo$.

Lastly, the means 20 comprise a multiplier 23 having two inputs, one of whose inputs is connected to the output of the amplifier 21 and the other of whose inputs is connected to the output of the summing device 22 and supplying, by multiplication, signals $-xo/4a$ and $2d_1 + xo$ in application of formula (1), the signal $x$.

The computer 17 comprises means 30 which, based on the signals $xo$, $yo$ and $d_1$, supply the signal $y$.

The means 30 comprise an amplifier 31 fed by the signal $yo$ coming from the amplifying device 19 and supplying a signal $-yo/4b$, a summing device 32 having three inputs receiving, on one input, the signal $xo$, on another input, the signal $yo$ and on a third input, the signal $d_1$ coming from the square root extractor 70 and supplying, on its output, the signal $2d_1 + 2\,xo + yo$.

The means 30 comprise, moreover, a multiplier 33 having two inputs, one of whose inputs is connected to the output of the amplifier 31 and whose other input is connected to the output of the summing device 32 and supplies, by application of formula (2), the signal $y$.

The computer 17 comprises, also, means 40 supplying, based on the signal $x$, the signal X. The means 40 are constituted by a summing device 41 receiving, on one input, the signal $x$ and, on the second input, a constant signal, the signal obtained at its output being $X = x + m$.

The computer 17 comprises, moreover, means 50 which is constituted by a summing device 51 receiving, on one input, the signal x, on a second input, the signal y and on a third input, a constant signal and supplying, on its output, a signal which is the sum of the signals $-x/tg\theta$, and $y/\sin\theta$ and $-a/tg\theta + b/\sin\theta + n$, this corresponding to the signal Y by application of the formula (4).

The means 60, making it possible to supply a signal $d_1^2$ based on the signals $x$, $y$ and H, comprise a first summing device 61 fed with a constant signal (k=1) and with the signal $x$ and supplying a signal $x + a$, as well as a second summing device 62 fed with a constant signal (k=1) and with the signal $y$ and supplying a signal $-x/tg\theta + y/\sin\theta - a/tg\theta + b/\sin\theta$, that is, Y − n.

The signal $x + a$ is applied to the two inputs of a multiplier 63 supplying a signal $(x + a)^2$.

The signal Y − n is applied to the two inputs of a multiplier 64 supplying a signal $(Y − n)^2$.

The signal H is applied to the two inputs of a multiplier 65 supplying a signal $H^2$.

The outputs of the multipliers 63, 64 and 65 are applied to the inputs of a summing device 66 which supplies the signal $d_1^2$.

The output of the summing device 66 is connected to the input of the square root extractor 70.

When calculating the signals X and Y, the angles of pitch and of roll (T and R) have not been taken into consideration.

When those angles are slight, the corrections to be applied to the formulas are in the form:

$$X' = X + TH$$

$$Y' = Y + RH$$

$$d'_1{}^2 = d_1^2 − 2H(bR + a\,T)$$

It is, moreover, possible to make a correction for pounding by taking as the value of $xo$, $xo = \Delta t_{21} c/\cos T) \simeq$ for $\Delta t_{21} c(1 + T^2 a)$, and as a value of $yo$, $yo = \Delta t_{32}(c/\cos R) \simeq \Delta t_{32} c(1 + R^2/2)$.

Figure 5:
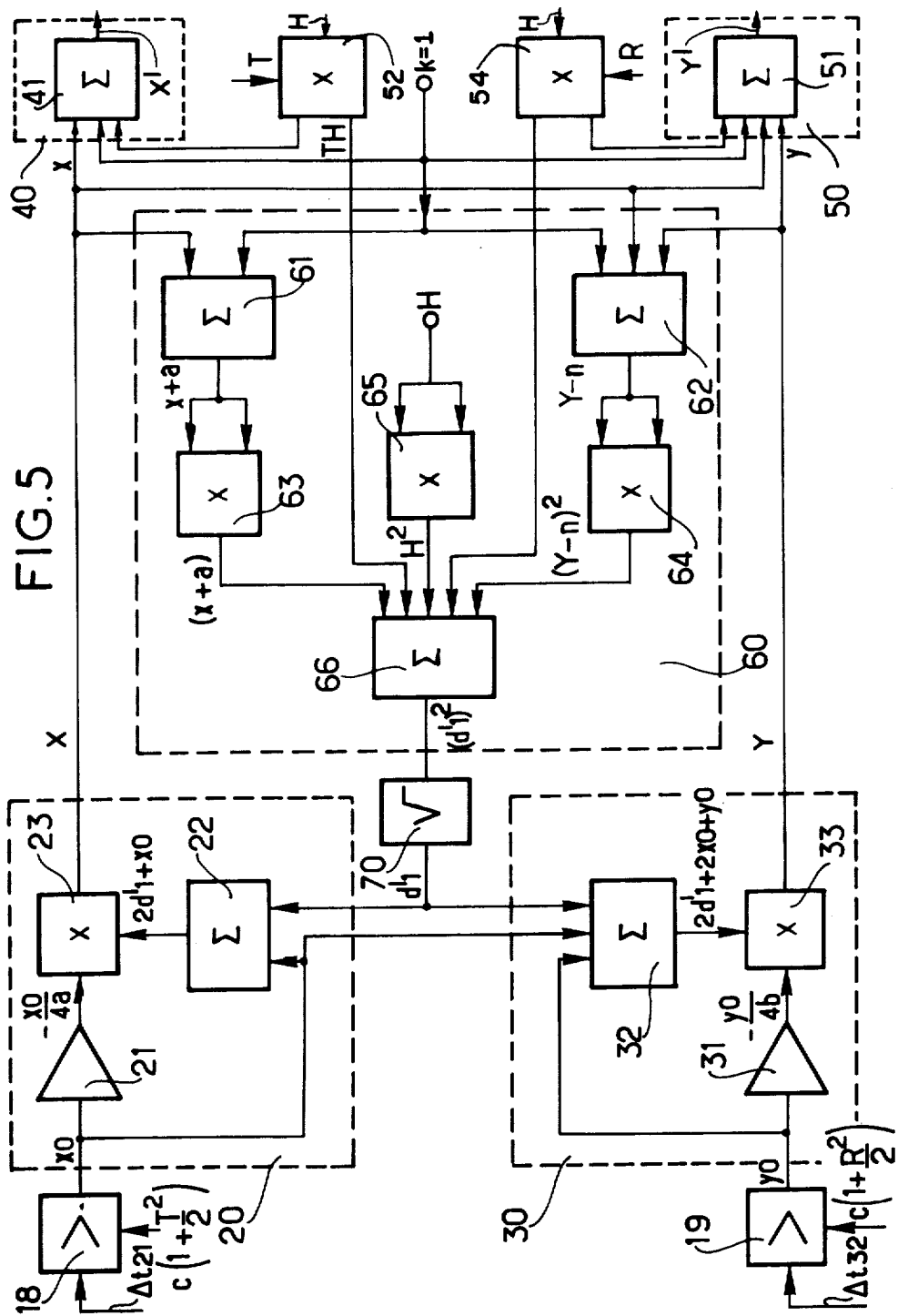
FIG. 5 shows a variant of the computer shown in FIG. 4.

FIG. 5 shows the complete computer making it possible to take these corrections into consideration; It comprises, moreover, elements of the computer in FIG. 4:

a multiplier 52 fed with the signal T and with the signal H and supplying a signal TH which is applied to a third input of the summing device 41 of the fourth means 40 which also supplies, then, the signal $X' = X + TH$;

a multiplier 54 fed with a signal T and with a signal H and supplying a signal RH which is applied to a fourth input of the summing device 51 of the fifth means 50 which supplies, then, the signal $Y' = Y + RH$.

The outputs of the multipliers 52 and 54 are connected to a fourth and fifth input of the summing device 6, which supplies the signal $(x+a)^2 + (Y−n)^2 + H^2 − bHR − 2a\,HT$.

To effect the correction for pounding, the coefficient of amplification of the amplifier 18 is corrected permanently and is in the form $c(1 + T^2/2)$ and the coefficient of amplification of the amplifier 19 is in the form $c(1 + R^2/2)$. The signals $c(1 + T^2/2)$ and $c(1 + R^2/2)$ can easily be obtained from T, and R by quadratic detection.

Figure 6:
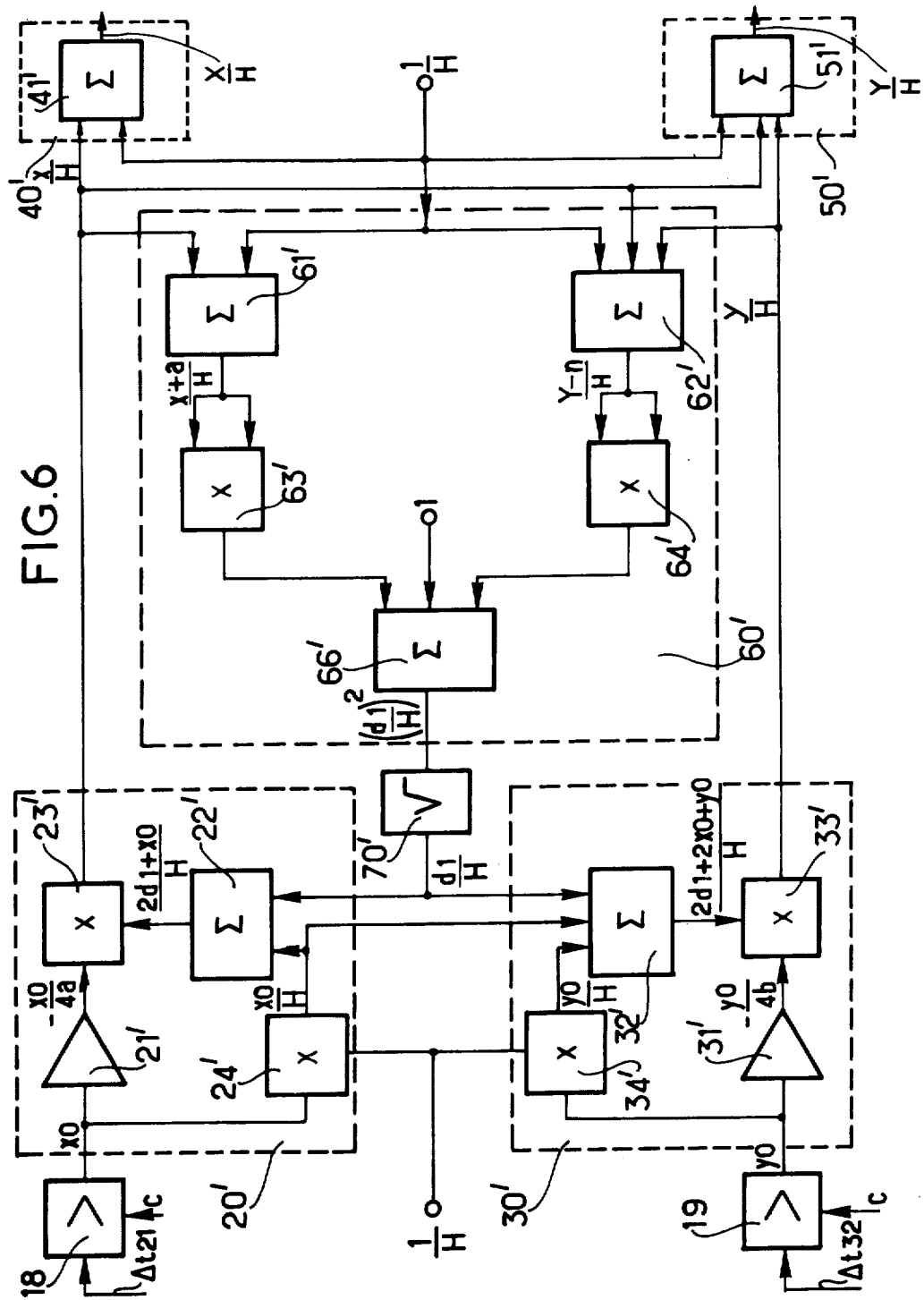
FIG. 6 shows a second embodiment of the computer of the position measuring device according to the invention.

FIG. 6 shows a second embodiment 17′ of the computer 17 according to the invention.

The computer 17′ supplies the signals $x/H$ and $y/H$ by application of formulas (1), (2), (3), (4), (5) which, after transformation, give:

$$\frac{x}{H} = -\frac{xo}{4a}\left(2\frac{d1}{H} + \frac{xo}{H}\right) \tag{6}$$

$$\frac{y}{H} = -\frac{yo}{4b}\left(2\frac{d1}{H} + 2\frac{xo}{H} + \frac{yo}{H}\right) \tag{7}$$

$$\left(\frac{d1}{H}\right)^2 = 1 + \left(\frac{x+a}{H}\right)^2 + \left(\frac{Y-n}{H}\right)^2 \tag{8}$$

$$\frac{Y}{H} = -\frac{1}{tg\theta}\frac{x}{H} + \frac{1}{\sin\theta}\frac{Y}{H} + \frac{1}{H}\left(\frac{b}{\sin\theta} - \frac{a}{tg\theta} + n\right) \tag{9}$$

$$\frac{X}{H} = \frac{x}{H} + \frac{m}{H}. \tag{10}$$

As in the computer 17 in FIG. 4, the magnitudes $xo$ and $yo$ corresponding to the differences in travel $d_2 − d_1$ and $d_3 − d_2$ are obtained by multiplying by $c$, which is the speed of sound in water, the differences in travel time $\Delta t_{21}$ and $\Delta t_{32}$. That multiplication is carried out by a first amplifying device 18 and a second amplifying device 19, supplied, the one by $\Delta t_{21}$, the other, by $\Delta t_{32}$; the first amplifying device 18 supplies the signal $xo = c\,\Delta t_{21}$ and the second amplifying device 19 supplies the signal $yo = c\,\Delta t_{32}$.

The computer 17′ also comprises means 20′ which, based on the signals $xo$, $d_1/H$ and H, supply the signal $x/H$.

The means 20′ comprise an amplifier 21′ fed by the signal $xo$ coming from the amplifying device 18 and supplying a signal $−xo/4a$, a first multiplier 24′, having two inputs, receiving, on one of them, the signal $xo$ and, on the other, a signal $1/H$ obtained by reversing of the signal H and supplying a signal $xo/H$, a summing device 22′, one of whose inputs receives the signal $xo/H$ and whose other input receives a signal $d1/H$ coming from a square root extractor 70′ fed by means 60′ supplying the signal $(d1/H)_2$ whose constitution will be described subsequently.

The summing device 22′ supplies, at its output, a signal equal to $2(d1/H) + (xo/H)$.

The means 20′ comprise, lastly, a second multiplier 23′, having two inputs, one of whose inputs is connected to the output of the amplifier 21′ and whose other input is connected to the output of the summing device 22′ and supplying, by multiplication of the signals $−xo/4a$ and $2(d1/H) + xo/H$ the signal $x/H$.

The computer 17′ comprises, also, means 30′ which, based on the signals $xo$, $yo$, $d1/H$ and H, supply the signal $y/H$.

The means 30′ comprise an amplifier 31′ fed by the signal $yo$ coming from the amplifying device 19 and supplying a signal $−yo/4b$, a first multiplier 34′ having two inputs receiving, on one of them, the signal $yo$ and on the other, the signal $1/H$ and supplying a signal $yo/H$, a summing device 32′ having three inputs receiving, on one input, the signal $xo/H$, on another input, the signal $yo/H$ and, on a third input, the signal $d1/H$ coming from the square root extractor 70′ and supplying, on its output, the signal $2(d1/H) + 2(xo/H) + yo/H$.

The means 30′ comprise, moreover, a second multiplier 33′ having 2 inputs, one of whose inputs is connected to the output of the amplifier 31′ and whose other input is connected to the output of the summing device 32′ and which supplies the signal $y/H$.

The computer 17′ comprises, also, means 40′ constituted by the summing device 41′, receiving, on one input, the signal $x/H$ and, on a second input, the signal $1/H$, and supplying, at its output, the signal $X/H = (x/H + m/H)$.

The computer 17′ comprises, moreover, means 50′ which are constituted by a summing device 51′ receiving, on one input, the signal $x/H$, on a second input, the signal $y/H$ and on a third input, the signal $1/H$, and supplying on its output, a signal which is the sum of the signals $$-\frac{1}{tg\theta}\frac{x}{H},\ \frac{1}{\sin\theta}\frac{y}{H}\ \text{and}\ \frac{1}{H}\left(-\frac{a}{tg\theta} + \frac{b}{\sin\theta} + n\right),$$

this corresponding to the signal $Y/H$ by application of the formula (9).

The means 60' making it possible to supply a signal $(d1/H)^2$ based on the signals $x/H$, $y/H$ and H, comprise a first summing device 61' fed with the signal $1/H$ obtained by reversing the signal H and by the signal $x/H$ and supplying a signal $(x+a/H)$, as well as a second summing device 62', fed with the signal $1/H$ with the signal $y/H$ and with the signal $x/H$, and supplying a signal $$-\frac{1}{tg\theta}\ \frac{x}{H} + \frac{1}{\sin\theta}\ \frac{y}{H} + \frac{1}{H}(\frac{a}{tg\theta} + \frac{b}{\sin\theta}), \text{ that is, } \frac{Y-n}{H}.$$

that is, $(Y-n/H$.

The signal $x+a/H$ is applied to the two inputs of a multiplier 63' supplying a signal $(x+a/H)^2$.

The signal $Y-n/H$ is applied to the two inputs of a multiplier 64' supplying a signal $(Y-n/H)^2$.

The outputs of the multipliers 63' and 64' are applied as well as a unity signal to a summing device 66' which supplies the signal $(d_1/H)^2$.

The output of the summing device 66' is connected to the input of the square root extractor 70'.

In the calculating of the signals X/H and Y/H, the angles of pitch and of roll (T and R) have not been taken into consideration.

When those angles are slight, the corrections to be made to the formulas are in the form:

$$X'/H = X/H + T$$

$$Y'/H = Y/H + R$$

$$(d'1/H)^2 = (d1/H)^2 - 2(b\ R/H + a\ T/H).$$

Figure 7:
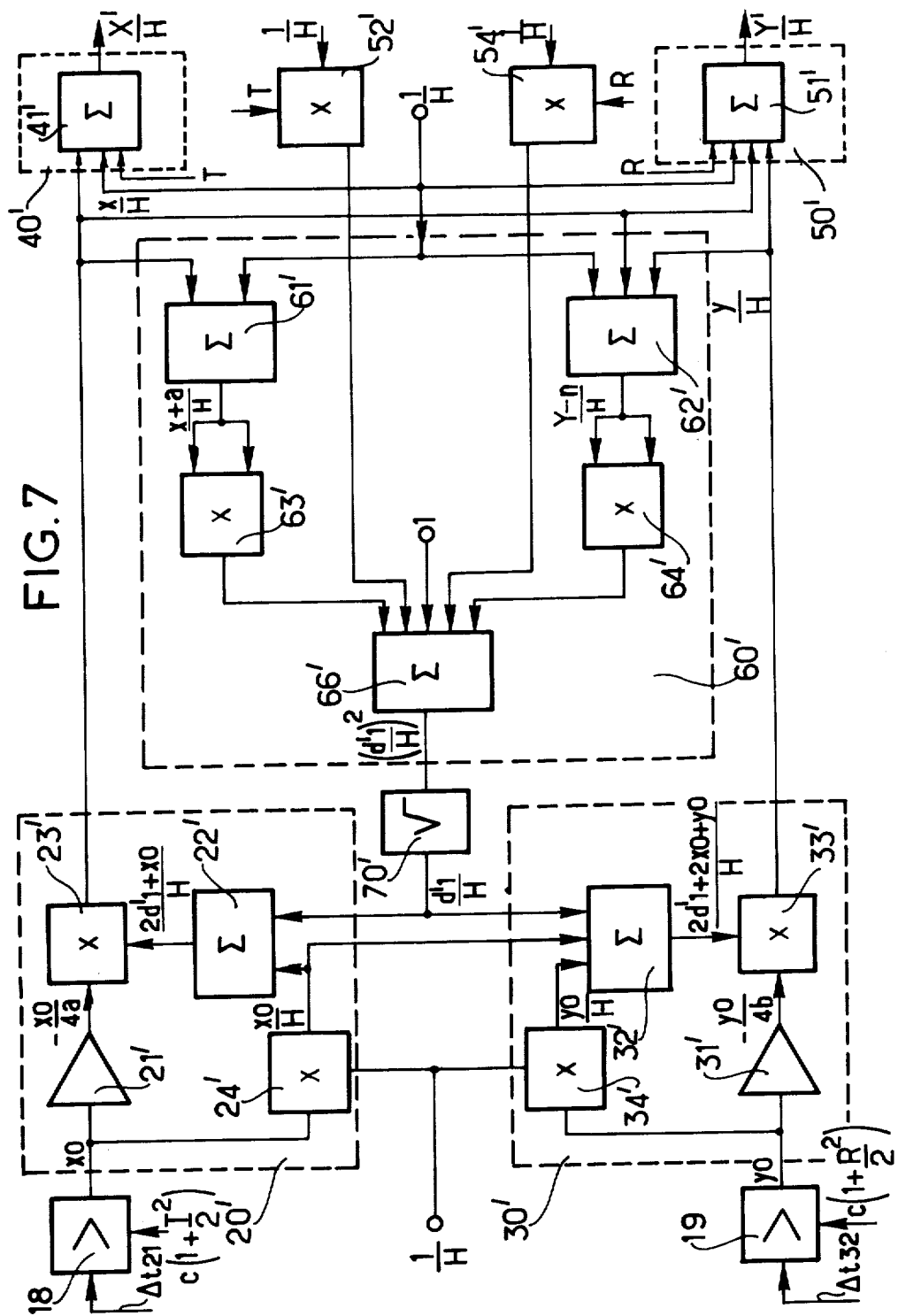
FIG. 7 shows an improvement to a variant of the computer in FIG. 6.

FIG. 7 shows the complete computer making it possible to take into consideration those corrections; to effect the first correction of pitch and of roll, the signal T is applied to the input of the summing device 41', so as to obtain $X'/H = X/H + T$ and the signal R at the input of the summing device 51' so as to obtain $Y'/H = Y/H + R$.

In relation to the computer in FIG. 6, the modified computer comprises, also, to make the platform correction on $(d1/H)^2$, a multiplier 52' working out the product of the signals T and $1/H$ and a multiplier 54' working out the product of the signals R and $1/H$.

The outputs of the multipliers 52' and 54' are connected to a fourth and fifth input of the summing device 66', which supplies the signal:

$$1 + (x+a/H)^2 + (y+b/H)^2 \sin^2\theta - 2(aT/H + bR/H)$$

which is equal to $(d'1/H)^2$ and which, after application to the square root extractor 70', is applied to the means 20' and 30'.

To make the correction for pounding, the coefficient of amplification of the amplifier 18 is corrected permanently and is in the form $c(1 + T^2/2)$ and the coefficient of amplification of the amplifier 19 is in the form $c(1 + R^2/2)$. The signals $c(1 + T^2/2)$ and $c(1 + R^2/2)$ can be obtained easily from T and R by quadratic detection.

The various summing devices used in the position measuring device are constituted by direct-current amplifier, and potentiometric resistors making it possible to produce the sum function $\Sigma\ ai\ si$, the various ai being adjusted by the potentiometric resistors and the various si being the signals applied to the inputs of the summing devices.

The depth of water H can be either given by a sound or displayed manually.

Although the position measuring device which has just been described may appear to afford the greatest advantages for implementing the invention, it will be understood that various modifications can be made thereto without going beyond the scope of the invention, it being possible to replace certain of its elements by other elements capable of fulfilling the same function or an equivalent function therein.

I claim:

1. In a position measuring device enabling the calculating of the magnitudes proportional to the coordinates X and Y of a vessel which can move on the water in relation to two axes of orthogonal coordinates IX and IY, comprising a sound wave emitter placed at a point 0 situated, at the bottom of the water, at least three detectors D1, D2, D3 on the bottom of the vessel and arranged at the apexes of a triangle, IX being parallel to D2 D1 and the plane of the axes IX, IY being the plane of the triangle D1, D2, D3, the distance between the detectors D1, D2 being 2a, the distance between the detectors D2, D3 being 2b, the distance between the point 0 and the detector D1 being $d_1$, the distance between the point 0 and the detector D2 being $d_2$, the distance between the point 0 and the detector D3 being $d_3$;

Means for calculating the depth of water H below the vessel;

Means for calculating the difference in the travel time $\Delta t_{21}$ of the sound waves between 0 and D2 on the one hand and 0 and D1 on the other hand;

Means for calculating the difference in the travel time $\Delta t_{32}$ of the sound waves between 0 and D3 on the one hand and 0 and D2 on the other hand; the improvement comprising:

First means (18, 19) supplying, on the basis of the difference in travel time $\Delta t_{21}$, by multiplication by a coefficient depending on the propagation speed c of sound waves in water, a signal xo equal to the difference between $d_2$ and $d_1$ and, on the basis of the difference in travel time $\Delta t_{32}$ by multiplication by a coefficient depending on c, a signal yo equal to the difference between $d_3$ and $d_2$;

Second means (20, 20') supplying, by algebraic multiplications and additions of the signals xo and $d_1$, a signal equal to kx, x being the distance of the point 0 in relation to the mid plane of D1 D2;

Third means (30, 30') supplying, by algebraic multiplications and additions of the signals xo, yo and $d_1$, a signal ky, y being equal to the distance of 0 in relation to the mid plane of D2 D3;

Fourth means (40) supplying, on the basis of kx, the signal kX;

Fifth means (50) supplying, on the basis of the signals kx, ky, the signal kY;

Sixth means (60, 60') supplying, by algebraic multiplications and additions of the signals kx, ky and H, a signal equal to $k^2d_1^2$ which, after application to a square root extractor (70, 70'), is applied to the second and third means (20, 20') (30, 30').

2. The improvement according to claim 1, characterized in that k is equal to 1.

3. The improvement according to claim 2, characterized in that said second means (20) comprises an amplifier (21) receiving, at the input, the signal *xo* and supplying, at its output, a signal — *xo*/4*a*;

an algebraic summing device (22) fed with the signals *xo* and $d_1$ and supplying a signal $2d_1 + xo$;

a multiplier (23) having two inputs, one of whose inputs is connected to the output of said amplifier (21) and whose other input is connected to output of the said summing machine (22) and supplying the signal *x*;

in that said third means (30) comprises:

an amplifier (31) receiving, on its input, the signal *yo* and supplying, on its output, the signal — *yo*/4*b*;

an algebraic summing device (32) receiving the signals *xo*, *yo* and $d_1$ supplying, on its output, the signal $2d_1 + 2xo + yo$;

a multiplier (33) having two inputs, one of whose inputs is connected to the output of said amplifier (31) and whose other input is connected to the output of said summing device (32) and supplying, on its output, the signal *y*;

in that said fourth means (40) comprises a summing device (41), receiving, on one input, the signal *x* and, on another input, a constant signal and supplying, on its output, the signal $X = x + m$, *m* being the abscissa of M, the mid-point of D2 D1 in relation to the axes IX, IY;

in that said fifth means (50) comprises a summing device (51) receiving, on one input, the signal *x*, on a second input, the signal *y* and on a third input, a constant signal and supplying, on its output, a signal $-(x/tg\theta) + (y/\sin\theta) - (a/tg\theta) + (b/\sin\theta) + n$, $\theta$ being the angle formed by D3 D2 with D2 D1, *n* being the ordinate of M, the mid-point of D2 D1 in relation to the axes IX, IY;

and in that said sixth means (60) comprises:

a first summing device (61) fed with the signal *x* coming from said second means (20) and with a constant signal and supplying a signal $x + a$, a second summing device (62) fed with the signal *x* coming from said second means (20), with the signal *y* coming from said third means (30) and with a constant signal and supplying a signal $Y - n$;

a first multiplier (63) having two inputs whose two inputs are connected to the output of said first summing device (61);

a second multiplier (64) having two inputs, whose two inputs are connected to the output of said second summing device (62);

A third summing device (66), one of whose inputs is connected to the output of the first multiplier (63), a second input of which is connected to the output of the second multiplier (64) and a third input of which receives the signal $H^2$ and whose output supplies the signal $d_1^2$ which is applied to a square root extractor (70) whose output is connected to the algebraic summing device (22, 32) of said second and third means (20, 30).

4. The improvement according to claim 3, characterized in that the summing device (41) of the fourth means (40) comprises an input to which is applied a signal equal to TH, T being the angle of pitch and in that the summing device (51) of the fifth means (50), comprises an input to which is applied a signal equal to RH, R being the roll angle.

5. The improvement according to claim 4, characterized in that said third summing device (66) of the said fourth means (60) receives, on a fourth input, a signal equal to TH and, on a fifth input, a signal equal to RH.

6. The improvement according to claim 5, characterized in that said first means (18, 19) supplies xo by multiplication of $\Delta t_{21}$ by a coefficient which is substantially equal to $c(1 + T_2^2)$ and yo by multiplication of $\Delta t_{32}$ by a coefficient equal to $c(1 + R_2^2)$.

7. The improvement according to claim 1, characterized in that *k* is equal to 1/H.

8. The improvement according to claim 4, characterized in that said second means (20') comprises:

an input amplifier (21') receiving, at the input, the signal *xo* and supplying, at its output, the signal — *xo*/4*a*;

a first multiplier (24') having two inputs, receiving, on one input, the signal *xo* and, on the other input, the signal 1/H;

an algebraic summing device (22') having two inputs, receiving, on one input, the signal *xo*/H coming from the first multiplier (24') and, on the other, the signal $d_1$/H and supplying, at its output, a signal $(2d_1 + xo)$/H;

a second multiplier (23') having two inputs, receiving, on one input, the signal — *xo*/4*a* coming from the input amplifier (21') and, on the other input, the signal coming from the said algebraic summing device (22') and supplying at its output, the signal *x*/H;

in that said third means (30') comprises an input amplifier (31') receiving, at its input, the signal *yo* and supplying the signal — *yo*/4*b*;

a first multiplier (34') having two inputs, receiving on one input, the signal *yo* and, on the other input, the signal 1/H and supplying a signal *yo*/H;

an algebraic summing device (32') having three inputs, receiving, on one input, the signal *yo*/H coming from the first multiplier (34'), on another input, the signal *xo*/H coming from the first multiplier (24') of said first means (20') and, on the third input, a signal $d_1$/H and supplying, on its output, the signal $(2d_1 + 2xo + yo/H)$;

a second multiplier (33') having two inputs, one of whose inputs is connected to the output of the input amplifier (31') and whose other input is connected to the output of said algebraic summing device (32') and supplying, at its output, the signal y/H;

in that said fourth means (40') comprises a summing device (41'), receiving, on one input, the signal *x*/H and, on an other input, a signal 1/H and supplying, at its output, the signal $X/H = (x + m/H)$; m being the abscissa of M, the mid-point of D2 D1 in relation to the axes IX, IY; in that said fifth means (50') comprises a summing device (51') receiving, on one input, the signal *x*/H, on a second input, the signal *y*/H and on a third input, the signal 1/H and supplying, on its output, a signal Y/H equal to $$-\frac{1}{tg\theta} \frac{x}{H} + \frac{1}{\sin\theta} \frac{y}{H} + \frac{1}{H}\left(\frac{b}{\sin\theta} - \frac{a}{tg\theta} + n\right);$$

$\theta$ being the angle formed by D3 D2 with D2 D1;

*n* being the ordinate of M, the mid-point of $D_2 D_1$ in relation to the axes of coordinates IX, IY;

and in that said sixth means (60') comprises.

a first summing device (61') having two inputs, receiving on one input the signal *x*/H coming from said second means (20') and on the other input, the signal 1/H and supplying, on its output, a signal $(x + a/H)$;

a second summing device (62') having two inputs, receiving, on one input the signal $x/H$ coming from said second means (20'), on the other input, the signal $y/H$ coming from said third means (30') and, on a third input, the signal $1/H$ and supplying, at its output, a signal $(Y - n)/H$;

a first multiplier (63') having two inputs, whose inputs are connected to the output of the first summing device (61');

a second multiplier (64') having two inputs, whose inputs are connected to the output of the second summing device (62');

a third summing device (66'), one of whose inputs is connected to the output of the first multiplier (63'), a second of whose inputs is connected to the output of the second multiplier (64') and a third input of which is fed with the unity signal;

the said third summing device (66') supplying, at its output, a signal $d1^2/H^2$ equal to the sum of the signals 1, $(x+a/H)^2$ and $-(Y-n/H)^2$ which is applied to the input of a square root extractor (70') whose output is connected to an input of the summing devices (22', 32') of said second and third means (20', 30').

9. The improvement according to claim 8, characterized in that the summing device (41') of said fourth means (40') comprises an input to which is applied a signal equal to T, T being the angle of pitch, and in that the summing device (51') of said fifth means (50') comprises an input to which is applied a signal equal to R, R being the angle of roll.

10. The improvement according to claim 9, characterized in that said third summing device (66') of said sixth means (60) receives, on a fourth input the signal T/H and, on a fifth input, the signal R/H.

11. The improvement according to claim 10, characterized in that said first means (18, 19) supplies xo by multiplication of $\Delta t_{21}$ by a coefficient substantially equal to $c (1 + T_2^2)$ and yo by multiplication of $\Delta t_{32}$ by a coefficient substantially equal to $c (1 + R_2^2)$.

* * * * *